United States Patent
You et al.

(10) Patent No.: US 10,802,307 B2
(45) Date of Patent: Oct. 13, 2020

(54) ANTI-PEEPING ASSEMBLY AND MANUFACTURING METHOD THEREOF, METHOD FOR CONTROLLING ANTI-PEEPING ASSEMBLY, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yang You, Beijing (CN); Ruizhi Yang, Beijing (CN); Fei Wang, Beijing (CN); Yanfeng Wang, Beijing (CN); Xiaoling Xu, Beijing (CN); Ruiyong Wang, Beijing (CN); Zhenhua Lv, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/061,329

(22) PCT Filed: Aug. 28, 2017

(86) PCT No.: PCT/CN2017/099260
§ 371 (c)(1),
(2) Date: Jun. 11, 2018

(87) PCT Pub. No.: WO2018/126711
PCT Pub. Date: Jul. 12, 2018

(65) Prior Publication Data
US 2019/0137804 A1    May 9, 2019

(30) Foreign Application Priority Data

Jan. 5, 2017 (CN) .......................... 2017 1 0006937

(51) Int. Cl.
*G02F 1/133* (2006.01)
*G09G 3/36* (2006.01)
(Continued)

(52) U.S. Cl.
CPC ........ *G02F 1/13306* (2013.01); *G02F 1/1333* (2013.01); *G02F 1/134309* (2013.01);
(Continued)

(58) Field of Classification Search
None
See application file for complete search history.

(56) References Cited

U.S. PATENT DOCUMENTS

2007/0085788 A1* 4/2007 Harada .................... G02F 1/135
345/84
2007/0146259 A1 6/2007 Jin et al.
(Continued)

FOREIGN PATENT DOCUMENTS

CN        1987983 A      6/2007
CN      201097041 Y      8/2008
(Continued)

OTHER PUBLICATIONS

Office Action received for Chinese Patent Application No. 201710006937.3, dated Mar. 21, 2019, 21 pages (10 pages of English Translation and 11 pages of Office Action).
International Search Report and Written Opinion received for PCT Patent Application No. PCT/CN2017/099260, dated Nov. 29, 2017, 14 pages (6 pages of English Translation and 8 pages of Original Document).

*Primary Examiner* — Carl Adams
(74) *Attorney, Agent, or Firm* — Womble Bond Dickinson (US) LLP

(57) ABSTRACT

An anti-peeping assembly and a manufacturing method thereof, a method for controlling an anti-peeping assembly and a display device are described. The anti-peeping assembly includes a first substrate and a second substrate arranged facing each other, and a liquid crystal layer located between (Continued)

said first substrate and said second substrate; wherein, a first electrode is disposed on said first substrate at a side near the liquid crystal layer, and a plurality of second electrodes arranged as an array are disposed on said second substrate at a side near the liquid crystal layer; and wherein, in response to applying a same voltage to said first electrode and any second electrode, liquid crystals between said first electrode and said any second electrode scatter light, and in response to applying different voltages to said first electrode and said any second electrode, liquid crystals between them transmit light.

7 Claims, 10 Drawing Sheets

(51) Int. Cl.
  *G02F 1/1343* (2006.01)
  *G02F 1/1333* (2006.01)
(52) U.S. Cl.
  CPC ......... *G02F 1/134336* (2013.01); *G09G 3/36* (2013.01); *G09G 2300/0426* (2013.01); *G09G 2320/028* (2013.01); *G09G 2320/068* (2013.01); *G09G 2358/00* (2013.01)

(56) References Cited

U.S. PATENT DOCUMENTS

| | | | |
|---|---|---|---|
| 2013/0076785 | A1 | 3/2013 | Chen |
| 2014/0063386 | A1* | 3/2014 | Yang .................... G02F 1/1323 349/33 |
| 2014/0240627 | A1 | 8/2014 | Wu |
| 2017/0032751 | A1* | 2/2017 | Jung .................... G09G 3/3648 |
| 2017/0139243 | A1 | 5/2017 | Ma |
| 2017/0255041 | A1* | 9/2017 | Chang ............... G02F 1/134336 |
| 2018/0059450 | A1 | 3/2018 | Li |

FOREIGN PATENT DOCUMENTS

| | | |
|---|---|---|
| CN | 101968585 A | 2/2011 |
| CN | 104851394 A | 8/2015 |
| CN | 105549236 A | 5/2016 |
| CN | 106019688 A | 10/2016 |
| CN | 205691897 U | 11/2016 |
| CN | 205809496 U | 12/2016 |
| CN | 106773373 A | 5/2017 |
| KR | 10-2007-0058257 A | 6/2007 |

* cited by examiner in response to the anti-peeping assembly being in an anti-peeping mode, applying a same voltage to the first electrode and the plurality of second electrodes of the anti-peeping assembly, so that liquid crystals between said first electrode and each of said plurality of second electrodes scatter light — 1601 in response to the anti-peeping assembly being in an non-anti-peeping mode, applying different voltages to the first electrode and the plurality of second electrodes of the anti-peeping assembly, so that liquid crystals between said first electrode and each of said plurality of second electrodes transmit light — 1602

FIG. 16 in response to the anti-peeping assembling being in an anti-peeping mode, applying a same voltage to the first electrode and the plurality of second electrodes of the anti-peeping assembly, so that liquid crystals between said first electrode and each of said plurality of second electrodes scatter light, and applying different voltages to the first electrode and the plurality of transmission electrodes of the anti-peeping assembly, so that liquid crystals between said first electrode and each of said plurality of transmission electrodes transmit light — 1701 in response to the anti-peeping assembly being in the non-anti-peeping mode, applying different voltages to the first electrode and the plurality of second electrodes of the anti-peeping assembly to enable liquid crystals between the first electrode and each second electrode of said plurality of second electrodes to transmit light, and applying different voltages to the first electrode and the plurality of transmission electrodes of the anti-peeping assembly to enable liquid crystals between the first electrode and each transmission electrode of said plurality of transmission electrodes to transmit light — 1702

FIG. 17

ANTI-PEEPING ASSEMBLY AND MANUFACTURING METHOD THEREOF, METHOD FOR CONTROLLING ANTI-PEEPING ASSEMBLY, AND DISPLAY DEVICE

RELATED APPLICATION

The present application is the U.S. national phase entry of PCT/CN2017/099260, with an international filing date of Aug. 28, 2017, which claims the benefit of Chinese Patent Application CN201710006937.3 filed on Jan. 5, 2017, the entire disclosures of which are incorporated herein by reference.

TECHNICAL FIELD

The present disclosure relates to the field of display technologies, in particular to an anti-peeping assembly and a manufacturing method thereof, a method for controlling an anti-peeping assembly and a display device.

BACKGROUND

With the rapid development of display technologies, applications of such display devices as mobile phones, televisions and on-vehicle terminals become wider and wider. When a user is viewing information on a display device, in order to prevent other users from peeping the information displayed on the display device, an anti-peeping assembly can be arranged on the display device.

A prior art anti-peeping assembly is usually an anti-peeping film, which can be adhered to a light-emergent surface of the display device to prevent peeping. The anti-peeping film usually includes a base and an anti-peeping layer disposed on the base, the anti-peeping layer comprises a plurality of strip transmission units that are parallel in a length direction and a plurality of strip absorbing units that are parallel in a length direction, one strip transmission unit being arranged between every two strip absorbing units, and the length direction of any strip absorbing unit being parallel to the length direction of any strip transmission unit. After adhering the anti-peeping film to the light-emergent surface of the display device, light emitted from the light-emergent surface of the display device is incident on the anti-peeping layer of the anti-peeping film, wherein light incident on the absorbing unit is absorbed by the absorbing unit and cannot come out from the anti-peeping film, while light incident on the transmission unit penetrates the transmission unit and comes out from the anti-peeping film, so that information displayed on the display device can be seen from a front viewing angle and cannot be seen from a side viewing angle, thereby realizing anti-peeping. The front viewing angle refers to a viewing angle when the display device is viewed from straight ahead, and the side viewing angle refers to a viewing angle when the display device is viewed from side ahead However, different application occasions have different anti-peeping requirements on the display device. For example, when the user is in an application occasion that has a secrecy demand, anti-peeping is necessary; when the user is in an application occasion that has a sharing demand, anti-peeping is not necessary. After adhering the anti-peeping film to the light-emergent surface of the display device using relevant technologies, information displayed on the display device cannot be seen from the side viewing angle, thus the display device cannot be applied to the application occasion having a sharing demand. Therefore, the anti-peeping assembly in the prior art cannot enable the display device to meet the requirements of different application occasions and the anti-peeping assembly is less flexible in terms of anti-peeping.

SUMMARY

According to a first aspect of the present disclosure, an anti-peeping assembly is provided, which comprises:
a first substrate and a second substrate arranged facing each other; and
a liquid crystal layer located between said first substrate and said second substrate;
wherein, a first electrode is disposed on said first substrate at a side near the liquid crystal layer, and a plurality of second electrodes arranged as an array are disposed on said second substrate at a side near the liquid crystal layer;
and wherein, in response to applying a same voltage to said first electrode and any second electrode of said plurality of second electrodes, liquid crystals between said first electrode and said any second electrode scatter light, and in response to applying different voltages to said first electrode and said any second electrode, liquid crystals between said first electrode and said any second electrode transmit light.

Alternatively, a plurality of transmission electrodes arranged as an array are also disposed on said second substrate at the side near the liquid crystal layer, and said plurality of transmission electrodes and said plurality of second electrodes are staggered.

Alternatively, there is an interval area between every two adjacent second electrodes among said plurality of second electrodes.

Alternatively, liquid crystals in said liquid crystal layer are polymer liquid crystals.

Alternatively, liquid crystals between said first electrode and each of said plurality of second electrodes are polymer liquid crystals, and liquid crystals between said first electrode and each of said plurality of transmission electrodes are nematic phase liquid crystals, or there is no liquid crystal between said first electrode and each of said plurality of transmission electrodes.

Alternatively, liquid crystals between said first electrode and each of said plurality of second electrodes are polymer liquid crystals, and liquid crystals between said first electrode and each of the interval areas are nematic phase liquid crystals, or there is no liquid crystal between said first electrode and each of the interval areas.

Alternatively, said first electrode is any one of a plate electrode, a strip electrode and a block electrode, and said second electrode is a strip electrode or a block electrode. Further, said transmission electrode has the same shape as said second electrode.

According to a second aspect of the present disclosure, a method for manufacturing an anti-peeping assembly is provided, which comprises:
providing a first substrate and a second substrate;
forming a first electrode on said first substrate;
forming a plurality of second electrodes arranged as an array on said second substrate;
arranging said first substrate to face said second substrate and disposing a liquid crystal layer between said first substrate and said second substrate, wherein, the first electrode is disposed on said first substrate at a side near the liquid crystal layer, and the plurality of second electrodes are disposed on said second substrate at a side near the liquid crystal layer;

wherein, in response to applying a same voltage to said first electrode and any second electrode of said plurality of second electrodes, liquid crystals between said first electrode and said any second electrode scatter light, and in response to applying different voltages to said first electrode and said any second electrode, liquid crystals between said first electrode and said any second electrode transmit light.

Alternatively, said method further comprises: after forming a plurality of second electrodes arranged as an array on said second substrate, forming a plurality of transmission electrodes arranged as an array on said second substrate on which said plurality of second electrodes are formed, such that said plurality of transmission electrodes and said plurality of second electrodes are staggered.

Alternatively, liquid crystals in said liquid crystal layer are polymer liquid crystals.

Alternatively, liquid crystals between said first electrode and each of said plurality of second electrodes are polymer liquid crystals, and liquid crystals between said first electrode and each of said plurality of transmission electrodes are nematic phase liquid crystals, or there is no liquid crystal between said first electrode and each of said plurality of transmission electrodes.

Alternatively, said method further comprises: arranging an interval area between every two adjacent second electrodes among said plurality of second electrodes, wherein liquid crystals between said first electrode and each of said plurality of second electrodes are polymer liquid crystals, and liquid crystals between said first electrode and each of the interval areas are nematic phase liquid crystals, or there is no liquid crystal between said first electrode and each of the interval areas.

Alternatively, arranging a liquid crystal layer between said first substrate and said second substrate comprises:

arranging a liquid crystal layer between said first substrate and said second substrate by means of a microcavity perfusion technology.

According to a third aspect of the present disclosure, a method for controlling the anti-peeping assembly according to the first aspect is provided, said method comprises:

in response to the anti-peeping assembly being in an anti-peeping mode, applying a same voltage to the first electrode and the plurality of second electrodes of the anti-peeping assembly, so that liquid crystals between said first electrode and each of said plurality of second electrodes scatter light; and in response to the anti-peeping assembly being in an non-anti-peeping mode, applying different voltages to the first electrode and the plurality of second electrodes of the anti-peeping assembly, so that liquid crystals between said first electrode and each of said plurality of second electrodes transmit light.

Alternatively, a plurality of transmission electrodes arranged as an array are also disposed on said second substrate at the side near the liquid crystal layer, and said plurality of transmission electrodes and said plurality of second electrodes are staggered, and said method further comprises:

applying different voltages to said first electrode and said plurality of transmission electrodes of the anti-peeping assembly, so that liquid crystals between said first electrode and each of said plurality of transmission electrodes transmit light.

Alternatively, in response to the anti-peeping assembly being in an anti-peeping mode, applying a same voltage to the first electrode and the plurality of second electrodes of the anti-peeping assembly, so that liquid crystals between said first electrode and each second electrode of said plurality of second electrodes scatter light comprises:

applying a first voltage to said first electrode and each of said plurality of second electrodes respectively, so that a voltage difference between said first electrode and said each second electrode is zero, and that the liquid crystals between said first electrode and said each second electrode are in an initial state so as to scatter light; and said applying different voltages to said first electrode and said plurality of transmission electrodes of the anti-peeping assembly, so that liquid crystals between said first electrode and each transmission electrode of said plurality of transmission electrodes transmit light comprises:

applying said first voltage to said first electrode, and applying a second voltage to each of said plurality of transmission electrodes, so that a voltage difference between said first electrode and said each transmission electrode is a pre-set voltage difference, and that the liquid crystals between said first electrode and said each transmission electrode deflect under the effect of said pre-set voltage difference so as to transmit light.

Alternatively, in response to the anti-peeping assembly being in the non-anti-peeping mode, said applying different voltages to the first electrode and the plurality of second electrodes of the anti-peeping assembly, so that liquid crystals between said first electrode and each second electrode of said plurality of second electrodes transmit light comprises:

applying the first voltage to the first electrode and applying the second voltage to each of said plurality of second electrodes, so that a voltage difference between said first electrode and said each second electrode is a pre-set voltage difference, and that the liquid crystals between said first electrode and said each second electrode deflect under the effect of said pre-set voltage difference so as to transmit light;

said applying different voltages to said first electrode and said plurality of transmission electrodes of the anti-peeping assembly, so that liquid crystals between said first electrode and each transmission electrode of said plurality of transmission electrodes transmit light comprises:

applying said first voltage to said first electrode, and applying said second voltage to each of said plurality of transmission electrodes, so that the voltage difference between said first electrode and said each transmission electrode is the pre-set voltage difference and that the liquid crystals between said first electrode and said each transmission electrode deflect under the effect of said pre-set voltage difference so as to transmit light.

According to a fourth aspect of the present disclosure, a display device is provided, which comprises a display panel and any of the above-described anti-peeping assembly.

It shall be understood that the above general descriptions and the detailed descriptions that will be given below are merely exemplary, and they do not intend to limit the present disclosure.

BRIEF DESCRIPTION OF THE DRAWINGS

In order to explain the technical solutions in the embodiments of the present disclosure more clearly, drawings that will be used in descriptions of the embodiments will be introduced briefly below. Obviously, the drawings described below are merely some examples of the present disclosure, and those skilled in the art can obtain other drawings from these drawings.

FIG. 16 is a flow chart of a method for controlling an anti-peeping assembly provided in an embodiment of the present embodiment;

FIG. 17 is a flow chart of another method for controlling an anti-peeping assembly provided in an embodiment of the present embodiment.

The drawings are incorporated into the description and form a part of the description, and they show embodiments complying with the principle of the present invention and are used together with the description for explaining the principle of the present invention.

DETAILED DESCRIPTION

In order to make the object, technical solution and advantages of the present disclosure clearer, the present disclosure will be described in further detail below with reference to the drawings. Obviously, the described embodiments are merely some instead of all of the embodiments of the present disclosure.

Viewing angle is a key index of a display device, and different application occasions have different requirements on the viewing angle of the display device. For example, when a user is in an open occasion having secrecy demands, the display device needs to have a narrower viewing angle, such that information displayed on the display device can be seen from the front viewing angle but not from a side viewing angle, thereby protecting personal privacy and realizing anti-peeping. When the user is in a private occasion having sharing demands, the display device needs to have a wider viewing angle, such that information displayed on the display device can be seen from every viewing angle, thereby realizing information sharing. Open occasions having secrecy demands can be, for example, entering bank cards' passwords, viewing personal information on public transports or carrying on business negotiation, etc.; private occasions having sharing demands can be, for example, viewing information displayed on a display device together with others. The anti-peeping assembly provided in the present disclosure can enable the display device to be applicable to both open occasions having secrecy demands and private occasions having sharing demands by changing the viewing angle of the display device, thus enabling the anti-peeping assembly to meet the demands of different application occasions.

Figure 1:
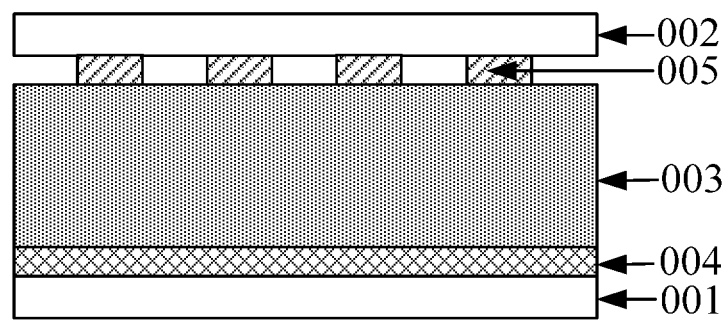
FIG. 1 is a structural diagram of an anti-peeping assembly provided by an embodiment of the present disclosure.

FIG. 1 is a structural diagram of an anti-peeping assembly 00 provided by an embodiment of the present disclosure. Said anti-peeping assembly 00 can be arranged on a display device (not shown in FIG. 1) to prevent peeping of information displayed on the display device. Referring to FIG. 1, said anti-peeping assembly 00 comprises:

a first substrate 001 and a second substrate 002 arranged facing each other, and a liquid crystal layer 003 located between said first substrate 001 and said second substrate 002, a first electrode 004 is disposed on said first substrate 001 at a side near the liquid crystal layer 003, and a plurality of second electrodes 005 arranged as an array are disposed on said second substrate 002 at a side near the liquid crystal layer 003;

wherein, in response to application of a same voltage to said first electrode 004 and any second electrode 005 of said plurality of second electrodes 005, liquid crystals between said first electrode 004 and said any second electrode 005 scatter light; and in response to application of different voltages to said first electrode 004 and said any second electrode 005, liquid crystals between said first electrode 004 and said any second electrode 005 transmit light.

In this way, in the anti-peeping assembly provided in the embodiment of the present disclosure, light can be either scattered or transmitted by applying voltages, wherein light scattering can realize anti-peeping and light transmission can realize information sharing, thus the anti-peeping assembly can meet the demands of different application occasions. This solves the problem of low anti-peeping flexibility of the anti-peeping assembly in relevant technologies and achieves the effect of improving anti-peeping flexibility of the anti-peeping assembly.

Alternatively, the first electrode 004 can be a common electrode, the first electrode 004 can be any one of a plate electrode, a strip electrode and a block electrode, and the second electrode 005 can be a strip electrode or a block electrode.

Figure 2:
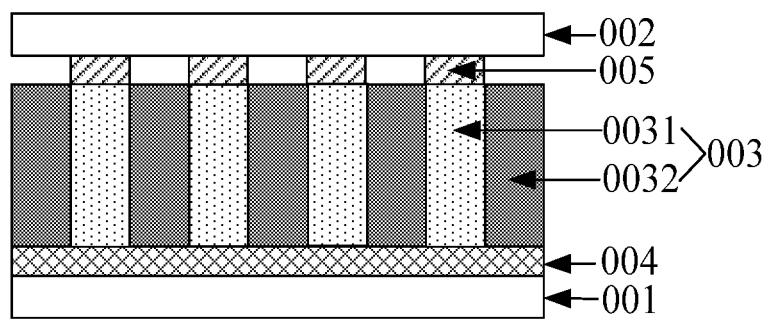
FIG. 2 is a structural diagram of another anti-peeping assembly provided by an embodiment of the present disclosure.
Figure 3:
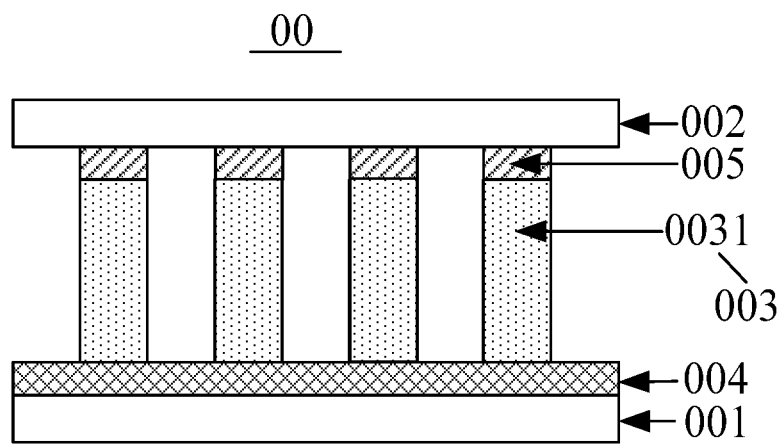
FIG. 3 is a structural diagram of still another anti-peeping assembly provided by an embodiment of the present disclosure.

Alternatively, as shown in any one of FIGS. 1-3, there is an interval area (not shown in FIG. 1) between every two adjacent second electrodes 005 among said plurality of second electrodes 005. Or, as shown in any one of claims 4-6, a plurality of transmission electrodes 006 arranged as an array are also disposed on said second substrate 002 at the side near the liquid crystal layer 003, and said plurality of transmission electrodes 006 and said plurality of second electrodes 005 are staggered, and the transmission electrodes 006 have the same shape as the second electrodes 005, namely, the transmission electrodes 006 are strip electrodes or block electrodes. In the case where both the second electrodes 005 and the transmission electrodes 006 are strip electrodes, stagger means that the second electrodes and the transmission electrodes are arranged in alternation, and the length direction of each second electrode 005 is parallel to the length direction of each transmission electrode 006; in the case where both the second electrodes 005 and the transmission electrodes 006 are block electrodes, stagger means that the second substrate 002 comprises a plurality of electrodes arranged as a matrix, which form a plurality of rows of second electrodes and a plurality of rows of transmission electrodes, each row of second electrodes including a plurality of second electrodes 005, and each row of transmission electrodes including a plurality of transmission electrodes 006, and the rows of second electrodes and the rows of transmission electrodes are arranged in alternation; or the second substrate 002 comprises a plurality of electrodes arranged as a matrix, which form a plurality of columns of second electrodes and a plurality of columns of transmission electrodes, each column of second electrodes including a plurality of second electrodes 005 and each column of transmission electrodes including a plurality of transmission electrodes 006, and the columns of second electrodes and the columns of transmission electrodes are arranged in alternation; or the second substrate 002 comprises a plurality of electrodes arranged as a matrix, which form a plurality of rows of electrodes and a plurality of columns of electrode, each row of electrodes including second electrodes 005 and transmission electrodes 006 arranged in alternation, and each column of electrodes including second electrodes 005 and transmission electrodes 006 arranged in alternation, while the embodiment of the present disclosure does not make limitations in this regard.

Figure 4:
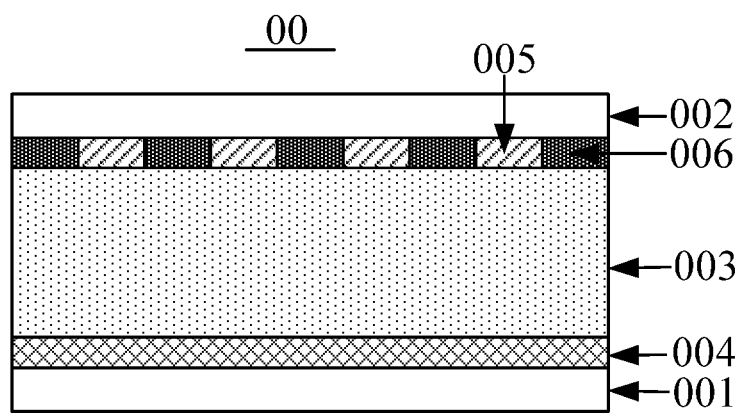
FIG. 4 is a structural diagram of yet another anti-peeping assembly provided by an embodiment of the present disclosure.

Alternatively, as shown in FIG. 4, the liquid crystals in the liquid crystal layer 003 are polymer liquid crystals. In response to applying different voltages to the first electrode 004 and any transmission electrode 006 of the plurality of transmission electrodes 006, liquid crystals between the first electrode 004 and said any transmission electrode 006 transmit light. In said FIG. 4, all liquid crystals in the liquid crystal layer 003 are polymer liquid crystals.

Alternatively, as shown in FIG. 2, the liquid crystals between the first electrode 004 and each second electrode 005 of the plurality of second electrodes 005 are polymer liquid crystals 0031, and the liquid crystals between the first electrode 004 and each interval area (not shown in FIG. 2) are nematic phase liquid crystals 0032; or as shown in FIG. 3 the liquid crystals between the first electrode 004 and each second electrode 005 of the plurality of second electrodes 005 are polymer liquid crystals 0031, and there is no liquid crystal between the first electrode 004 and each interval area. In this example, the interval area refers to the area between two adjacent second electrodes 005.

Figure 5:
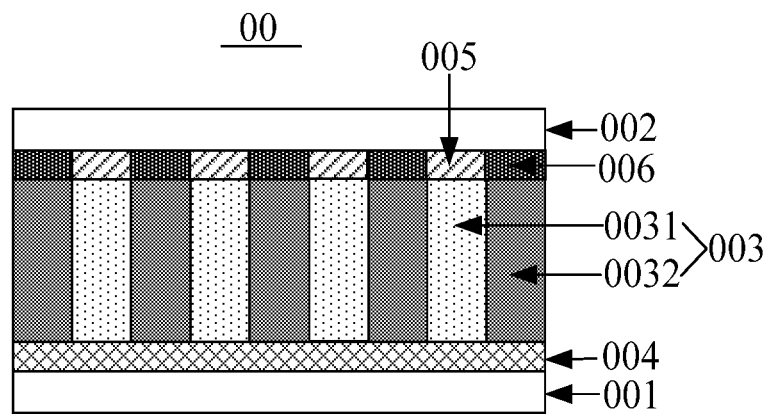
FIG. 5 is a structural diagram of yet another anti-peeping assembly provided by an embodiment of the present disclosure.
Figure 6:
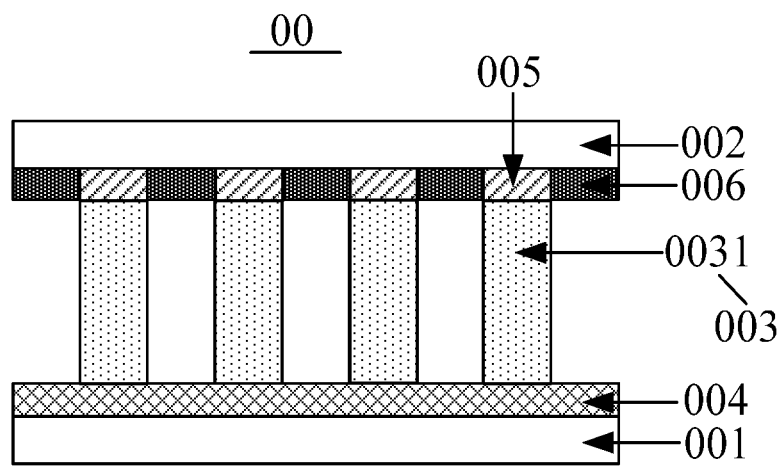
FIG. 6 is a structural diagram of yet another anti-peeping assembly provided by an embodiment of the present disclosure.

Alternatively, as shown in FIG. 5, the liquid crystals between the first electrode 004 and each second electrode 005 of the plurality of second electrodes 005 are polymer liquid crystals 0031, and the liquid crystals between the first electrode and each transmission electrode 006 of a plurality of transmission electrodes 006 are nematic phase liquid crystals 0032; or as shown in FIG. 6, the liquid crystals between the first electrode 004 and each second electrode 005 of the plurality of second electrodes 005 are polymer liquid crystals 0031, and there is no liquid crystal between the first electrode 004 and each transmission electrode 006 of a plurality of transmission electrodes 006.

Figure 7:
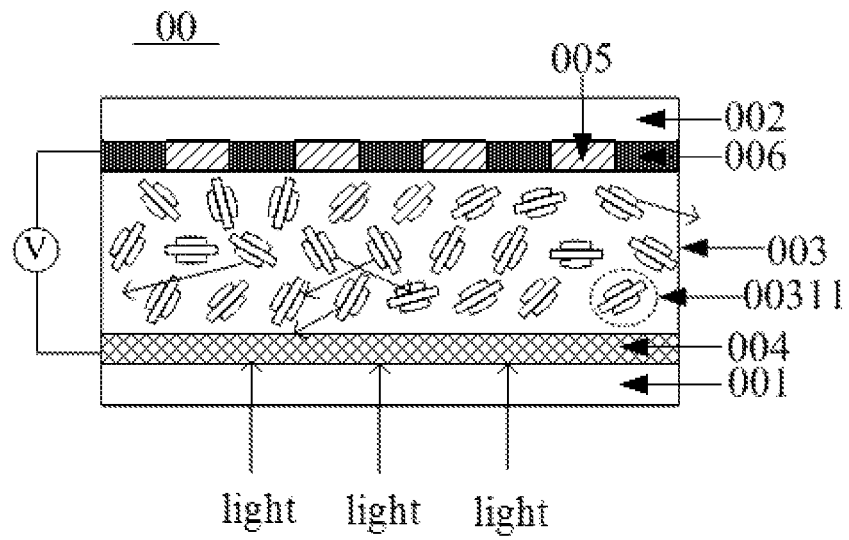
FIG. 7 is a state diagram of the anti-peeping assembly as shown in FIG. 4.
Figure 8:
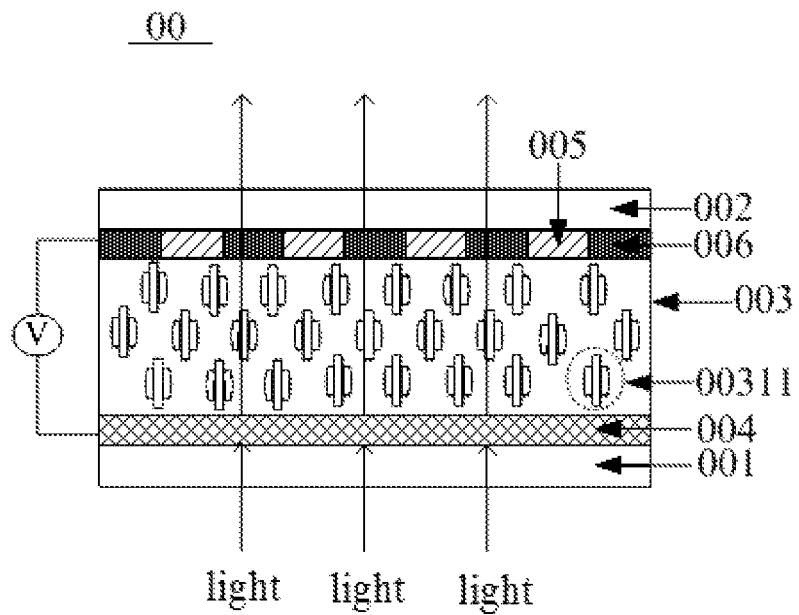
FIG. 8 is another state diagram of the anti-peeping assembly as shown in FIG. 4.

It shall be noted that the polymer liquid crystals are formed by mixing the nematic phase liquid crystals with a polymer matrix and performing photopolymerization, thermal initiation or solvent volatilization, and the minimal particles of the polymer liquid crystals are polymer liquid crystal particles. Seeing from the viewing angle of human eyes, the polymer liquid crystals usually have the two states of mist state and transparent state when driving by an electrical field. Now the anti-peeping assembly 00 as shown in FIG. 4 will be used as an example to illustrate the state transition process of the polymer liquid crystals under the effect of the electrical field. Specifically, in response to applying a same voltage to the first electrode 004, the second electrode 005 and the transmission electrode 006 or applying no voltage to the first electrode 004, the second electrode 005 and the transmission electrode 006, a voltage difference between the first electrode 004 and each second electrode 005 and a voltage difference between the first electrode 004 and each transmission electrode 00 are both zero, then there is no electrical field between the first electrode 004 and each second electrode 005 and between the first electrode 004 and each transmission electrode 006, and arrangement of the polymer liquid crystal particles in the liquid crystal layer 003 can be as shown in FIG. 7. Referring to FIG. 7, the polymer liquid crystal particles 00311 in the liquid crystal layer 003 are arranged disorderly, and each of the polymer liquid crystal particles 00311 has a different director (long axis direction of the polymer liquid crystal particle), and directors of the polymer liquid crystal particles 00311 are randomly distributed, wherein the director of each polymer liquid crystal particle 00311 is different from the electrical field direction (vertical to the first substrate 001 and the second substrate 002). Then the refractive indexes of liquid crystal droplets do not match the refractive index of the polymer, so light incident into the liquid crystal layer 003 from the first substrate 001 is scattered under the effect of the polymer liquid crystal particles 00311 and cannot come out from the second substrate 002, as a result, the polymer liquid crystals are in the mist state. However, in response to applying the same voltage to the second electrode 005 and the transmission electrode 006 but applying different voltages to the first electrode 004 and the second electrode 005, the voltage difference between the first electrode 004 and the second electrode 005 and the voltage difference between the first electrode 004 and the transmission electrode 006 are both the pre-set voltage difference. Then there is an electrical field between the first electrode 004 and the second electrode 005 and between the first electrode 004 and the transmission electrode 006, as a result, the arrangement of the polymer liquid crystal particles in the liquid crystal layer 003 can be as shown in FIG. 8. Referring to FIG. 8, the polymer liquid crystal particles 00311 in the liquid crystal layer 003 are arranged orderly, and the director of each polymer liquid crystal particle 00311 is parallel to the electrical field direction, then the refractive indexes of liquid crystal droplets are approximately the same as the refractive index of the polymer. Since the refractive indexes match, light incident into the liquid crystal layer 003 from the first substrate 001 penetrates the liquid crystal layer 003 and comes out from the second substrate 002, as a result, the polymer liquid crystals are in the transparent state.

When the anti-peeping assembly 00 provided in the embodiment of the present disclosure is in an anti-peeping mode, images of a transparent state are seen from the front viewing angle of the display device (i.e. information displayed on the display device can be seen clearly), while images of a mist state are seen from the side viewing angle of the display device (i.e. information displayed on the display device cannot be seen clearly), and the display device has a narrow viewing angle at this time. When the anti-peeping assembly 00 is in a non-anti-peeping mode, images of a transparent state are seen from all viewing angles, and the display device has a wide viewing angle at this time so as to realize wide-angle display. The descriptions below still use FIG. 4 as an example.

Figure 9:
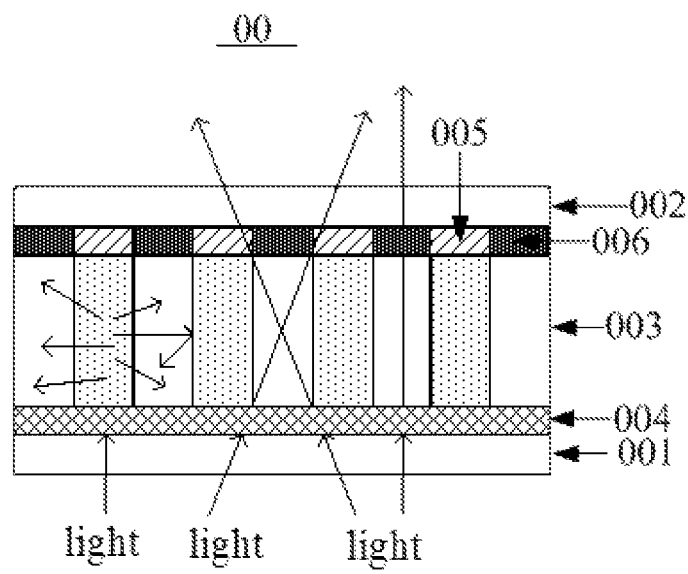
FIG. 9 is a working principle diagram of the anti-peeping assembly as shown in FIG. 4.
Figure 10:
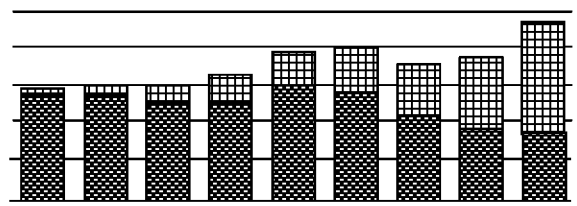
FIG. 10 shows an image viewed from a front viewing angle of a display device with the anti-peeping assembly provided therewith.
Figure 11:
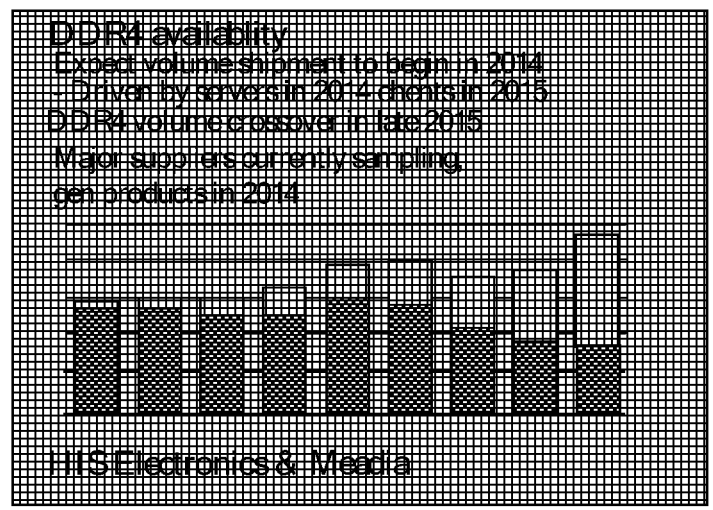
FIG. 11 shown an image viewed from a side viewing angle of display device with the anti-peeping assembly provided therewith.
Figure 12:
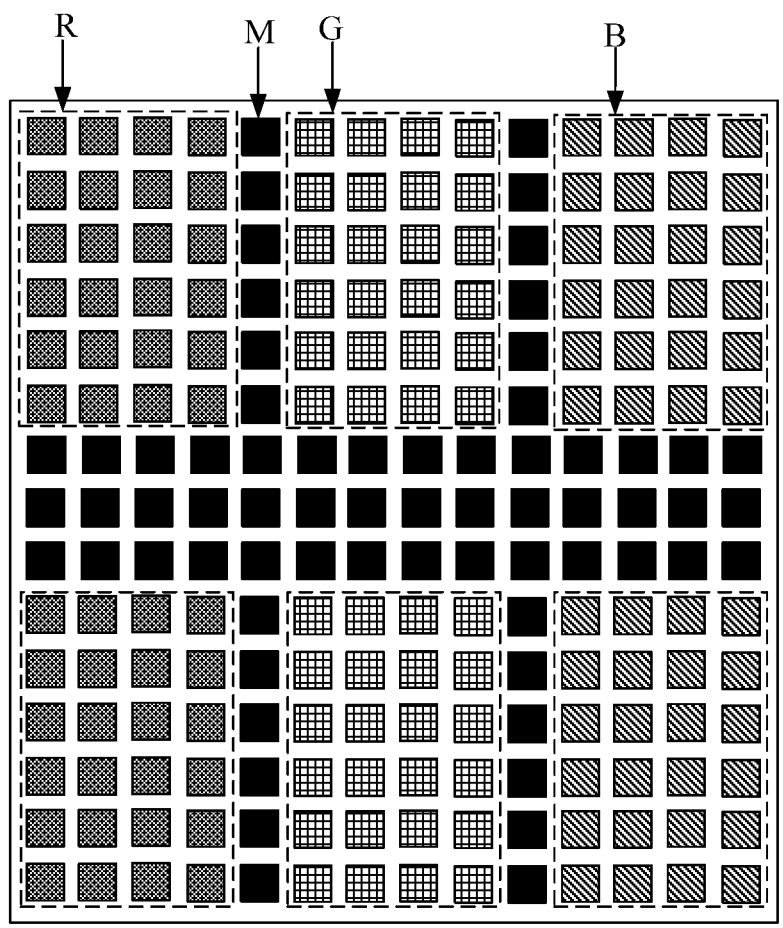
FIG. 12 is a top view of a display device involved in an embodiment of the present disclosure.

In response to the anti-peeping assembly 00 being in the anti-peeping mode, the same voltage is applied to each second electrode 005 and the first electrode 004 and different voltages are applied to each transmission electrode 006 and the first electrode 004 or voltages are not applied to all transmission electrodes 006. Then the voltage difference between the first electrode 004 and each second electrode 005 is zero, and the voltage difference between the first electrode 004 and each transmission electrode 006 can be the pre-set voltage difference whose magnitude is a pre-set threshold. Therefore, there is no electrical field between the first electrode 004 and each second electrode 005, and there is an electrical field between the first electrode 004 and each transmission electrode 006, such that the polymer liquid crystal particles between the first electrode 004 and each second electrode 005 do not deflect, while the polymer liquid crystal particles between the first electrode 004 and each transmission electrode 006 deflect. The anti-peeping assembly 00 herein can be as shown in FIG. 9. Referring to FIG. 9, when light is incident from the first substrate 001 into the liquid crystal layer 003, light incident between the first electrode 004 and each second electrode 005 is scattered in the liquid crystal layer 003 (referring to FIG. 7 for the specific principle thereof), and light incident between the first electrode 004 and each transmission electrode 006 is transmitted through the liquid crystal layer 003 and comes out from the second substrate 002 (referring to FIG. 8 for the specific principle thereof). It shall be pointed out that FIG. 9 is only a schematic drawing of the light incident between the first electrode 004 and one second electrode 005, while schematic drawings of light incident between the first electrode 004 and other second electrodes 005 are similar to FIG. 9. Referring to FIG. 9, light can penetrate through the liquid crystal layer 003 no matter in what incident angle it is incident between the first electrode 004 and the transmission electrode 006, that is to say, light coining out from the liquid crystal layer between the first electrode 004 and the transmission electrode 006 is irrelevant to the incident angle in which the light is incident on the liquid crystal layer 003. It shall be pointed out that when the anti-peeping assembly 00 is disposed on the display device and is in the state as shown in FIG. 9, some regions on the display device have emergent light and some regions do not. In practical application, regions having emergent light and regions having no emergent light are arranged in alternation, and the area of a single region is too small to be perceived by human eyes. Therefore, since regions having no emergent light are mingled with regions having emergent light, when the display device is viewed from the front viewing angle, the emergent light can come into the human eyes and the human eyes see clear images (transparent state images) as shown in FIG. 10, and the display device has a wide viewing angle at this time; when the display device is viewed from a side viewing angle, owing to the block by the polymer liquid crystals between the first electrode 004 and the second electrode 005, the emergent light cannot come into the human eyes, so the human eyes see the mist state images as shown in FIG. 11, and the display device has a narrow viewing angle at this time. Since transparent state images are seen when viewing the display device from the front viewing angle, and mist state images are seen when viewing the display device from the side viewing angle, the anti-peeping function can be realized. It shall be noted that the mist state image as shown in FIG. 11 is merely exemplary but it does not means to limit the present disclosure. As an example, reference can be made to FIG. 12, which shows a top view of a display device. The display device has a plurality of sub-pixels R, a plurality of sub-pixels G, a plurality sub-pixels B and a black matrix M, wherein each sub-pixel R, each sub-pixel G, each sub-pixel B and the black matrix M occupy a very small area on the display device, so they cannot be perceived by human eyes. In the embodiment of the present disclosure, the area of a region having emergent light on the display device can be smaller than the area of any sub-pixel, and the area of a region having no emergent light can also be smaller than the area of any sub-pixel (e.g. both the areas of the regions having emergent light and the areas of the regions having no emergent light are smaller than the area of the sub-pixel R). Therefore, the areas of the regions having emergent light and the areas of the regions having no emergent light are very small, and when viewing information on the display device from the front viewing angle, said regions having no emergent light will not have any influence to the images seen by the human eyes. It shall be pointed out that the regions having emergent light can be regions where the transmission electrodes 006 are located, and regions having no emergent light can be regions where the second electrodes 005 are located. The example described herein is that the areas of the regions (i.e. the second electrodes 005) having no emergent light are smaller than the area of any sub-pixel, and the areas of the regions (i.e. the transmission electrodes 006) having emergent light are smaller than the area of any sub-pixel. In practical application, the area of the second electrode 005 can be greater than or equal to the area of any sub-pixel, and the area of the transmission electrode 006 can also be greater than or equal to the area of any sub-pixel, which are not limited by the embodiments of the present disclosure.

Figure 13:
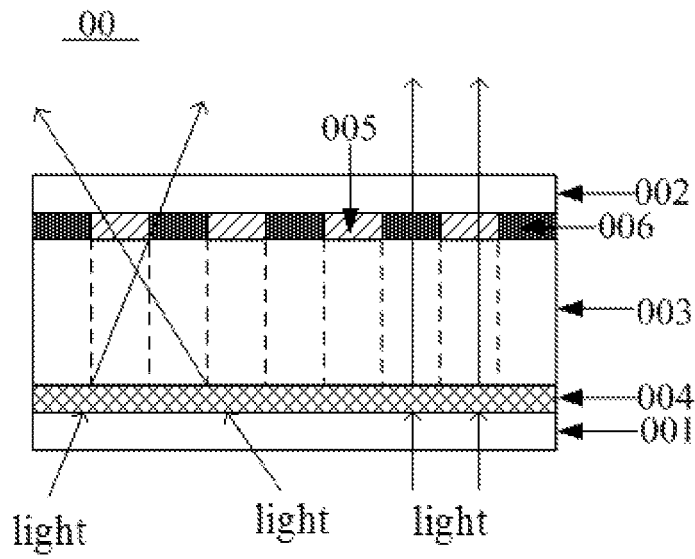
FIG. 13 is another working principle diagram of the anti-peeping assembly as shown in FIG. 4.

In response to the anti-peeping assembly 00 being in the non-anti-peeping mode, different voltages are applied to each second electrode 005 and the first electrode 004 and the same voltage is applied to each transmission electrode 006 and the first electrode 004, or voltage is applied only to the first electrode 004 but not to the second electrodes 005 and the transmission electrodes 006. Then the voltage differences between the first electrode 004 and each second electrode 005 and between the first electrode 004 and each transmission electrode 006 can both be the pre-set voltage difference, whose magnitude is the pre-set threshold. Thus there is an electrical field between the first electrode 004 and each second electrode 005 and there is an electrical field between the first electrode 004 and each transmission electrode 006, and all polymer liquid crystal particles in the liquid crystal layer 003 deflect. The anti-peeping assembly 00 at this time can be as shown in FIG. 13, in which light is incident from the first substrate 001 into the liquid crystal layer 003 and penetrates the liquid crystal layer 003 to come out from the second substrate 002. Referring to FIG. 13, light can penetrate through the liquid crystal layer 003 no matter in what incident angle it is incident into the liquid crystal layer 003, that is to say, light coining out from the liquid crystal layer 003 is irrelevant to the incident angle in which the light is incident into the liquid crystal layer 003. It shall be pointed out that when the anti-peeping assembly 00 is arranged on the display device and is in the state as shown in FIG. 13, all regions on the display device have emergent light, so either from the front viewing angle or from the side viewing angle, the human eyes can see clear images as shown in FIG. 10, and the display device has a wide viewing angle at this time, thus realizing wide-angle display.

It shall be noted that in the case of the anti-peeping assembly 00 provided in the embodiment of the present disclosure, in response to applying the same voltage to the first electrode 004 and any second electrode 005 of the plurality of second electrodes 005, the liquid crystals between the first electrode 004 and any second electrode 005 scatter light so that light cannot come out from the second substrate 002, and this is equivalent to forming a light absorbing unit between the first electrode 004 and any second electrode 005. At this time, a plurality of light absorbing units arranged as an array are formed between the first substrate 001 and the second substrate 002, and if the second electrodes 005 are strip electrodes, as far as the entire anti-peeping assembly 00 is concerned, these light absorbing units are like blinds, making viewers see scattered mist state images from two side viewing angles (e.g. upper side viewing angle and lower side viewing angle) and see normal transmitted images from the front viewing angle and other two side viewing angles (e.g. left side viewing angle and right side viewing angle), thereby realizing anti-peeping; if the second electrodes 005 are block electrodes, as far as the entire anti-peeping assembly 00 is concerned, these light absorbing units are like crisscross blinds, making viewers see scattered mist state images from all side viewing angles and see normal transmitted images from the front viewing angle, thereby realizing full-scale anti-peeping. In the embodiment of the present disclosure, a distance between the first substrate 001 and the second substrate 002 can be changed to enable the anti-peeping assembly 00 to meet the anti-peeping requirement and to become thin. Alternatively, the distance between the first substrate 001 and the second substrate 002 can be within the range of 1·50 μm.

It shall also be noted that the above texts take the anti-peeping assembly 00 as shown in FIG. 4 as an example to illustrate the anti-peeping principle of the anti-peeping assembly provided in the present disclosure, and the anti-peeping principle of the anti-peeping assembly 00 as shown in FIG. 2, FIG. 3, FIG. 5 and FIG. 6 will be described below.

In the case where the anti-peeping assembly is the anti-peeping assembly 00 as shown in FIG. 2, since the nematic phase liquid crystals have a normally white display mode, light can penetrate through the liquid crystal layer including the nematic phase liquid crystals without application of any voltage. At this time, in the anti-peeping mode, no voltage is applied to the first electrode 004 and the second electrodes 005, or the same voltage is applied to the first electrode 004 and the second electrodes 005 so as to realize anti-peeping. In the non-anti-peeping mode, different voltages are applied to the first electrode 004 and the second electrodes 005, so that the polymer liquid crystal particles between the first electrode 004 and the second electrodes 005 deflect to enable light to penetrate through the polymer liquid crystals of the first electrode 004 and the second electrodes 005 to come out from the second substrate 002, and light incident into the nematic phase liquid crystals directly penetrates through the nematic phase liquid crystals to come out from the second substrate 002.

In the case where the anti-peeping assembly is the anti-peeping assembly 00 as shown in FIG. 3, since there is no liquid crystal between the interval area and the first electrode 004, light incident between the interval area and the first electrode 004 can directly come out from the liquid crystal layer. At this time, in the anti-peeping mode, no voltage is applied to the first electrode 004 and the second electrodes 005, or the same voltage is applied to the first electrode 004 and the second electrodes 005 so as to realize anti-peeping. In the non-anti-peeping mode, different voltages are applied to the first electrode 004 and the second electrodes 005, so that the polymer liquid crystal particles between the first electrode 004 and the second electrodes 005 deflect, then light penetrates through the polymer liquid crystals of the first electrode 004 and the second electrodes 005 to come out from the second substrate 002, and light incident between the interval area and the first electrode 004 directly comes out from the second substrate 002.

In the case where the anti-peeping assembly is the anti-peeping assembly 00 as shown in FIG. 5, since the nematic phase liquid crystals have a normally white display mode, light can penetrate through the liquid crystal layer including the nematic phase liquid crystals by means of applying the same voltage to the first electrode 004 and the transmission electrode 006 or without application of any voltage. At this time, in the anti-peeping mode, no voltage is applied to the first electrode 004, the second electrodes 005 and the transmission electrode 006, or the same voltage is applied to the first electrode 004, the second electrodes 005 and the transmission electrode 006 so as to realize anti-peeping. In the non-anti-peeping mode, different voltages are applied to the first electrode 004 and the second electrodes 005, and the same voltage is applied to the transmission electrode 006 and the first electrode 004, so that the polymer liquid crystal particles between the first electrode 004 and the second electrodes 005 deflect to enable light to penetrate through the polymer liquid crystals of the first electrode 004 and the second electrodes 005 to come out from the second substrate 002, meanwhile, light incident into the nematic phase liquid crystals directly penetrates through the nematic phase liquid crystals to come out from the second substrate 002.

In the case where the anti-peeping assembly is the anti-peeping assembly 00 as shown in FIG. 6, since there is no liquid crystal between the transmission electrode 006 and the first electrode 004, light incident between the transmission electrode 006 and the first electrode 004 can directly come out from the liquid crystal layer. At this time, in the anti-peeping mode, no voltage is applied to the first electrode 004, the second electrodes 005 and the transmission electrode 006, or the same voltage is applied to the first electrode 004, the second electrodes 005 and the transmission electrode 006 so as to realize anti-peeping. In the non-anti-peeping mode, different voltages are applied to the first electrode 004 and the second electrodes 005, so that the polymer liquid crystal particles between the first electrode 004 and the second electrodes 005 deflect, then light penetrates through the polymer liquid crystals of the first electrode 004 and the second electrodes 005 to come out from the second substrate 002, meanwhile, light incident between the transmission electrode 006 and the first electrode 004 directly comes out from the second substrate 002.

In summary, in the anti-peeping assembly provided in the embodiment of the present invention, in response to applying the same voltage to the first electrode and any second electrode of the plurality of second electrodes, the liquid crystals between the first electrode and any second electrode scatter light, and in response to applying different voltages to the first electrode and any second electrode, the liquid crystals between the first electrode and any second electrode transmit light. Light scattering can Anti-peeping can be realized when light is scattered and information sharing can be realized when light is transmitted, thus by applying voltages to make light scattered or transmitted, the anti-peeping assembly can meet the demands of different application occasions. This solves the problem of low anti-peeping flexibility of the anti-peeping assembly in relevant technologies and achieves the effect of improving anti-peeping flexibility of the anti-peeping assembly.

The anti-peeping assembly provided in the embodiment of the present disclosure can adjust the viewing angle of the display device, enabling a dynamic transition between the narrow viewing angle and the wide viewing angle of the display device. When the display device is in a narrow viewing angle, transparent state images can be seen from the front viewing angle of the display device while only mist state images can be seen from the side viewing angle of the display device, thereby realizing anti-peeping. When the display device is in a wide viewing angle, transparent state images can be seen from all viewing angles of the display device. Thus the anti-peeping assembly provided in the embodiment of the present disclosure can choose to enable anti-peeping or not according to the application occasions, thereby improving anti-peeping flexibility.

If the anti-peeping assembly provided in the embodiment of the present disclosure is in the anti-peeping mode, mist state images are seen from all viewing angles of the display device, so anti-peeping is realized in all viewing angles of the display device and personal privacy is perfectly protected. Compared to the common anti-peeping film in the art, the anti-peeping assembly provided in the embodiment of the present disclosure has good weatherability and reliability.

Figure 14:
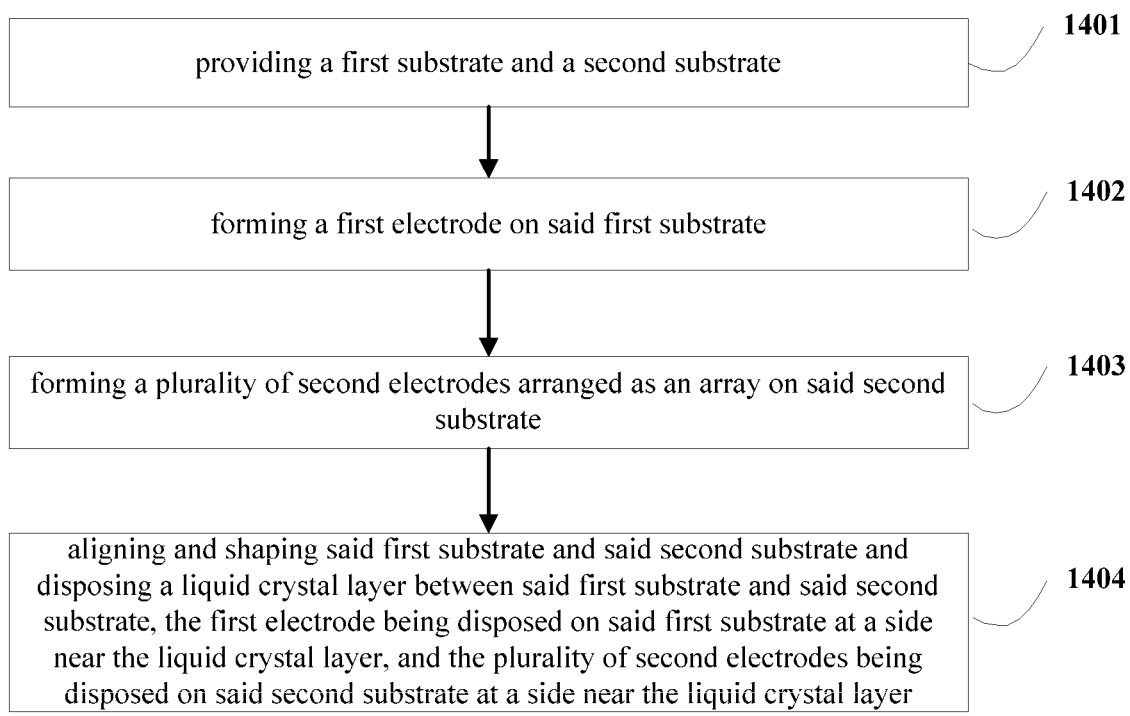
FIG. 14 is a flow chart of a method for manufacturing an anti-peeping assembly provided in an embodiment of the present disclosure.

FIG. 14 is a flow chart of a method for manufacturing an anti-peeping assembly provided in an embodiment of the present disclosure. Said method for manufacturing an anti-peeping assembly can be used for manufacturing the anti-peeping assembly 00 as shown in FIGS. 1-6. Said method for manufacturing an anti-peeping assembly comprises:

step 1401: providing a first substrate and a second substrate;

step 1402: forming a first electrode on said first substrate;

step 1403: forming a plurality of second electrodes arranged as an array on said second substrate;

step 1404: arranging said first substrate to face said second substrate and disposing a liquid crystal layer between said first substrate and said second substrate, wherein, the first electrode is disposed on said first substrate at a side near the liquid crystal layer, and the plurality of second electrodes are disposed on said second substrate at a side near the liquid crystal layer;

wherein, in response to applying a same voltage to said first electrode and any second electrode of said plurality of second electrodes, liquid crystals between said first electrode and said any second electrode scatter light, and in response to applying different voltages to said first electrode and said any second electrode, liquid crystals between said first electrode and said any second electrode transmit light.

Light scattering can realize anti-peeping and light transmission can realize information sharing. In this way, light can be scattered or transmitted by applying voltages so as to meet the demands of different application occasions. This solves the problem of low anti-peeping flexibility of the anti-peeping assembly in relevant technologies and achieves the effect of improving anti-peeping flexibility of the anti-peeping assembly.

Figure 15A:
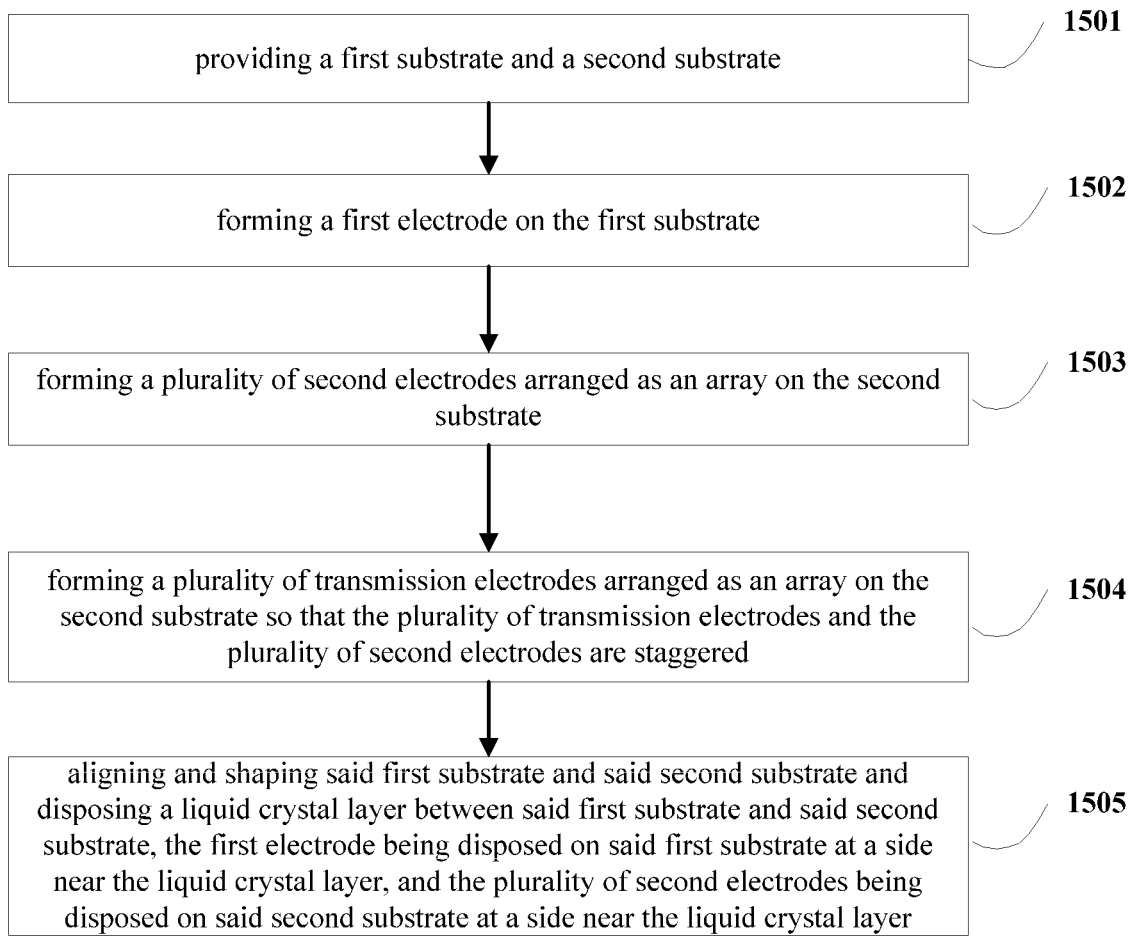
FIG. 15A a flow chart of another method for manufacturing an anti-peeping assembly provided in an embodiment of the present disclosure.

FIG. 15A a flow chart of another method for manufacturing an anti-peeping assembly provided in an embodiment of the present disclosure. Said method for manufacturing an anti-peeping assembly can be used for manufacturing the anti-peeping assembly 00 as shown in any one of FIGS. 1-6. This embodiment describes the example of manufacturing the anti-peeping assembly 00 as shown in FIG. 4. In the anti-peeping assembly 00 shown in FIG. 4, the liquid crystals in the liquid crystal layer 003 are polymer liquid crystals. Referring to FIG. 15A, said method for manufacturing an anti-peeping assembly comprises:

step 1501: providing a first substrate and a second substrate. Both the first substrate and the second substrate can be transparent substrates, and they can be substrates made of light-conducting non-metal materials having certain sturdiness, such as glass, quartz, transparent resin, etc.; or the first substrate can be a substrate having certain patterns formed thereon, which is not limited by the embodiment of the present disclosure.

Figure 15B:
FIG. 15B is a structural diagram of a first substrate which is manufactured according to the method of FIG. 15A and on which a first electrode is formed.

Step 1502: forming a first electrode on said first substrate. FIG. 15B shows a first substrate 001 which is manufactured according to the method provided by FIG. 15A and on which a first electrode 004 is formed, said first electrode 004 can be any one of a plate electrode, a strip electrode and a block electrode, and said first electrode 004 can be made of such semiconductor oxides as indium tin oxide (ITO), Indium zinc oxide (IZO), etc. The thickness of the first electrode 004 can be set as desired, which is not limited by the embodiment of the present disclosure. The embodiment of the present disclosure describes the example in which the first electrode 004 is a plate electrode and is made of ITO.

As an example, a layer of ITO material can be deposited on the first substrate 001 by means of coating, magnetron sputtering, thermal evaporation or plasma enhanced chemical vapor deposition (PECVD), etc. to obtain an ITO material layer, and said ITO material layer is the plate shape first electrode 004.

It shall be noted that in case the first electrode 004 is a strip electrode or a block electrode, after obtaining the ITO material layer, the ITO material layer may be processed by a one-time patterning process to obtain the first electrode 004. The one-time patterning process includes: photoresist coating, exposing, developing, etching and photoresist peeling, so processing the ITO material layer by means of the one-time patterning process comprises: coating a layer of photoresist on the ITO material layer and exposing the photoresist using a mask to make the photoresist to form a fully-exposed area and a non-exposed area, then processing with a developing technology to remove the photoresist in the fully-exposed area and retain the photoresist in the non-exposed area, next etching an area on the ITO material layer corresponding to the fully-exposed area, and peeling the photoresist off the non-exposed area after the etching so as to obtain the first electrode 004. The example described herein is using the positive photoresist to form the first electrode 004, but in practical application, negative photoresist can also be used to form the first electrode, which will not be elaborated herein.

Figure 15C:
FIG. 15C is a structural diagram of a second substrate which is manufactured according to the method of FIG. 15A and on which a plurality of second electrodes arranged as an array are formed.

Step 1503: forming a plurality of second electrodes arranged as an array on said second substrate. FIG. 15C shows a second substrate 002 which is manufactured according to the method provided by FIG. 15A and on which a plurality of second electrodes arranged as an array are formed. Said second electrode 005 can be a strip electrode or a block electrode, and said first electrode 004 can be made of such semiconductor oxides as ITO, IZO, etc., and the thickness of the second electrode 005 can be set as desired, which is not limited by the embodiment of the present disclosure.

For example, a layer of ITO material can be deposited on the second substrate 002 by means of coating, magnetron sputtering, thermal evaporation or PECVD, etc. to obtain an ITO material layer, then said ITO material layer is processed by means of a one-time patterning process to obtain the plurality of second electrodes 005 arranged as an array. As for the one-time patterning process, reference can be made to step 1502, which will not be elaborated herein anymore.

Figure 15D:
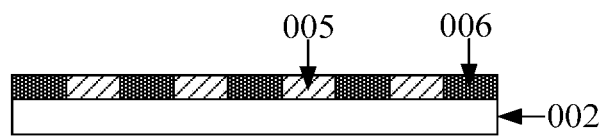
FIG. 15D is a structural diagram of a second substrate which is manufactured according to the method of FIG. 15A and on which a plurality of transmission electrodes arranged as an array and a second electrode are formed.

Step 1504: forming a plurality of transmission electrodes arranged as an array on the second substrate on which a plurality of second electrodes are formed, so that the plurality of transmission electrodes and the plurality of second electrodes are staggered. FIG. 15D shows a second substrate 002 which is manufactured according to the method provided in FIG. 15A and on which a plurality of second electrodes 005 are formed, a plurality of transmission electrodes 006 arranged as an array are further formed on the second substrate 002, said transmission electrodes 006 having the same shape as the second electrodes 004, namely, said transmission electrodes 006 are strip electrodes or block electrodes. Referring to FIG. 15D, said plurality of transmission electrodes 006 and said plurality of second electrodes 005 are staggered, said transmission electrodes 006 can be made of such semiconductor oxides as ITO and IZO, and the thickness of the transmission electrode 006 can be set as desired. As for the process of forming the plurality of transmission electrodes 006 arranged as an array on the second substrate 002 on which the plurality of second electrodes 004 are formed, reference can be made to step 1503, which will not be elaborated herein anymore.

step 1505: arranging said first substrate to face said second substrate and disposing a liquid crystal layer between said first substrate and said second substrate, such that the first electrode is disposed on said first substrate at a side near the liquid crystal layer, and the plurality of second electrodes are disposed on said second substrate at a side near the liquid crystal layer;

Reference can be made to FIG. 4 for the structural diagram of disposing the first substrate to face the second substrate. A liquid crystal layer 003 is formed between the first substrate 001 and the second substrate 002, and the first electrode 004 is on the first substrate 001 at a side near the liquid crystal layer 003, and the plurality of second electrodes 005 are on the second substrate 002 at a side near the liquid crystal layer 003, and the liquid crystals in said liquid crystal layer 003 can be polymer liquid crystals. Specifically, sealing frames can be arranged at peripheral areas of a side of the first substrate 001 on which the first electrode 004 is formed, then polymer liquid crystals are dripped by means of a dripping process within a space surrounded by the sealing frames on the first substrate 001 on which the first electrode 004 is formed so as to obtain the liquid crystal layer 003, next the side of the first substrate 001 on which the first electrode 004 is formed is faced and pressed to the side of the second substrate 002 on which the second electrode 005 is formed to obtain the anti-peeping assembly 00 as shown in FIG. 4. Alternatively, the first substrate 001 and the second substrate 002 can be disposed facing each other first, and then the liquid crystal layer 003 is arranged between the first substrate 001 and the second substrate 002 by means of the microcavity perfusion technology so as to obtain the anti-peeping assembly 00 as shown in FIG. 4. The embodiment of the present disclosure does not make limitation in this regard.

It shall be noted that the embodiment of the present disclosure provides illustrations by taking manufacturing of the anti-peeping assembly 00 shown in FIG. 4 as an example, nevertheless, the method for manufacturing an anti-peeping assembly provided in the embedment of the present disclosure can also be used for manufacturing the anti-peeping assembly 00 as shown in any one of FIGS. 1-3 and 5-6, and in view of the second electrodes 005 having different shapes from the transmission electrodes 006, the embodiment of the present disclosure can use different methods to manufacture the anti-peeping assembly 00.

In the case where the anti-peeping assembly 00 is the anti-peeping assembly 00 as shown in FIG. 2, the anti-peeping assembly 00 can be made through the above steps 1501-1503 and the present step 1505. At this time, if the second electrodes 005 are strip electrodes, in step 1505, first, a plurality of strip microcavities arranged as an array are formed on the first substrate 001 on which the first electrode 004 is formed, said plurality of microcavities being corresponding to the plurality of second electrodes 005 and a length direction of any microcavity being parallel to a length direction of any second electrode 005; then disposing the side of the first substrate 001 on which the first electrode 004 is formed to face the side of the second electrode 002 on which the second electrode 005 is formed; finally polymer liquid crystals are perfused into each microcavity and nematic phase liquid crystals are perfused in any two adjacent microcavities by means of the microcavity perfusion technology so as to obtain the anti-peeping assembly 00 as shown in FIG. 2. Alternatively, first, a plurality of strip microcavities arranged as an array are formed on the first substrate 001 on which the first electrode 004 is formed, said plurality of microcavities being corresponding to the plurality of interval areas and the length direction of any microcavity being parallel to the length direction of any second electrode 005; then disposing the side of the first substrate 001 on which the first electrode 004 is formed to face the side of the second electrode 002 on which the second electrode 005 is formed; finally nematic phase liquid crystals are perfused into each microcavity and polymer liquid crystals are perfused into any two adjacent microcavities by means of the microcavity perfusion technology so as to obtain the anti-peeping assembly 00 as shown in FIG. 2. Alternatively, first, a plurality of strip and consecutive microcavities are formed on the first substrate 001 on which the first electrode 004 is formed, said plurality of microcavities being corresponding to the plurality of second electrodes 005 and the plurality of interval areas (i.e. each microcavity corresponding to one second electrode 005 or one interval area), and a length direction of any microcavity being parallel to a length direction of any second electrode 005; then disposing the side of the first substrate 001 on which the first electrode 004 is formed to face the side of the second electrode 002 on which the second electrode 005 is formed; finally polymer liquid crystals are perfused into the microcavity between each second electrode 005 and the first electrode 004 and nematic phase liquid crystals are perfused into the microcavity between each interval area and the first electrode 004 by means of the microcavity perfusion technology so as to obtain the anti-peeping assembly 00 as shown in FIG. 2.

In this example, if the second electrodes 005 are block electrodes, in step 1505, first, a plurality of microcavities arranged as a matrix are formed on the first substrate 001 on which the first electrode 004 is formed, an orthographic projection of each microcavity on the first substrate 001 having a block shape and the plurality of microcavities being corresponding to the plurality of second electrodes 005; then polymer liquid crystals are perfused into each microcavity and nematic phase liquid crystals are perfused into every two adjacent microcavities by means of the microcavity perfusion technology, next the side of the first substrate 001 on which the first electrode 004 is formed is faced and pressed to the side of the second substrate 002 on which the second electrode 005 is formed to obtain the anti-peeping assembly 00 as shown in FIG. 2. Alternatively, a plurality of microcavities arranged as a matrix are formed on the first substrate 001 on which the first electrode 004 is formed, an orthographic projection of each microcavity on the first substrate 001 having a block shape and the plurality of microcavities being corresponding to the plurality of interval areas; then nematic phase liquid crystals are perfused into each microcavity by means of the microcavity perfusion technology and polymer liquid crystals are perfused into every two adjacent microcavities, next the side of the first substrate 001 on which the first electrode 004 is formed is faced and pressed to the side of the second substrate 002 on which the second electrode 005 is formed to obtain the anti-peeping assembly 00 as shown in FIG. 2. Alternatively, first, a plurality of consecutive microcavities are formed on the first substrate 001 on which the first electrode 004 is formed, said plurality of microcavities being corresponding to the plurality of second electrodes 005 and the plurality of interval areas (i.e. each microcavity corresponding to one second electrode 005 or one interval area); then by means of the microcavity perfusion technology, polymer liquid crystals are perfused into the microcavity between the first electrode 004 and each second electrode 005 and nematic phase liquid crystals are perfused into the microcavity between the first electrode 004 and each interval area, next the side of the first substrate 001 on which the first electrode 004 is formed is faced and pressed to the side of the second substrate 002 on which the second electrode 005 is formed to obtain the anti-peeping assembly 00 as shown in FIG. 2.

In the case where the anti-peeping assembly 00 is the anti-peeping assembly 00 as shown in FIG. 3, the anti-peeping assembly 00 can be made through the above steps 1501-1503 and the present step 1505. If the second electrodes 005 are strip electrodes, in step 1505, first, a plurality of strip microcavities arranged as an array are formed on the first substrate 001 on which the first electrode 004 is formed, said plurality of microcavities being corresponding to the plurality of second electrodes 005 and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into each microcavity by means of the microcavity perfusion technology and a vacuum environment is formed between every two adjacent microcavities so as to obtain the anti-peeping assembly as shown in FIG. 3. Alternatively, first, a plurality of strip microcavities arranged as an array are formed on the first substrate 001 on which the first electrode 004 is formed, said plurality of microcavities being corresponding to the plurality of interval areas and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into every two adjacent microcavities by means of the microcavity perfusion technology and a vacuum environment is formed in each microcavity so as to obtain the anti-peeping assembly 00 as shown in FIG. 3. Alternatively, first, a plurality of strip and consecutive microcavities are formed on the first substrate 001 on which the first electrode 004 is formed, said plurality of microcavities being corresponding to the plurality of second electrodes 005 and the plurality of interval areas (i.e. each microcavity corresponding to one second electrode 005 or one interval area), and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into the microcavity between each second electrode 005 and the first electrode 004 by means of the microcavity perfusion technology and a vacuum environment is formed in the microcavity between each interval area and the first electrode 004 so as to obtain the anti-peeping assembly 00 as shown in FIG. 3.

In this example, if the second electrodes 005 are block electrodes, in step 1505, first, a plurality of microcavities arranged as a matrix are formed on the first substrate 001 on which the first electrode 004 is formed, the plurality of microcavities being corresponding to the plurality of second electrodes 005; then polymer liquid crystals are perfused into each microcavity by means of the microcavity perfusion technology and a vacuum environment is formed between the first electrode 004 and each interval area; next the side of the first substrate 001 on which the first electrode 004 is formed is faced and pressed to the side of the second substrate 002 on which the second electrode 005 is formed to obtain the anti-peeping assembly 00 as shown in FIG. 3. Alternatively, a plurality of microcavities arranged as a matrix are formed on the first substrate 001 on which the first electrode 004 is formed, the plurality of microcavities being corresponding to the plurality of interval areas; then polymer liquid crystals are perfused into every two adjacent microcavities by means of the microcavity perfusion technology and a vacuum environment is formed in each microcavity; next the side of the first substrate 001 on which the first electrode 004 is formed is faced and pressed to the side of the second substrate 002 on which the second electrode 005 is formed to obtain the anti-peeping assembly 00 as shown in FIG. 3. Alternatively, first, a plurality of consecutive microcavities are formed on the first substrate 001 on which the first electrode 004 is formed, said plurality of microcavities being corresponding to the plurality of second electrodes 005 and the plurality of interval areas (i.e. each microcavity corresponding to one second electrode 005 or one interval area); then polymer liquid crystals are perfused into the microcavity between the first electrode 004 and each second electrode 005 by means of the microcavity perfusion technology and a vacuum environment is formed in the microcavity between the first electrode 004 and each interval area; next the side of the first substrate 001 on which the first electrode 004 is formed is faced and pressed to the side of the second substrate 002 on which the second electrode 005 is formed to obtain the anti-peeping assembly 00 as shown in FIG. 3.

In the case where the anti-peeping assembly 00 is the anti-peeping assembly 00 as shown in FIG. 5, the anti-peeping assembly 00 can be made through the above steps 1501-1504 and the present step 1505. If the second electrodes 005 are strip electrodes, in step 1505, first, a plurality of strip microcavities arranged as an array are formed on the first substrate 001 on which the first electrode 004 is formed, said plurality of microcavities being corresponding to the plurality of second electrodes 005 and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into each microcavity and nematic phase liquid crystals are perfused in any two adjacent microcavities by means of the microcavity perfusion technology so as to obtain the anti-peeping assembly 00 as shown in FIG. 5. Alternatively, first, a plurality of strip microcavities arranged as an array are formed on the first substrate 001 on which the first electrode 004 is formed, said plurality of microcavities being corresponding to the plurality of transmission electrodes 006 and the length direction of any microcavity being parallel to the length direction of any second electrode 005; then disposing the side of the first substrate 001 on which the first electrode 004 is formed to face the side of the second electrode 002 on which the second electrode 005 is formed; finally nematic phase liquid crystals are perfused into each microcavity and polymer liquid crystals are perfused into any two adjacent microcavities by means of the microcavity perfusion technology so as to obtain the anti-peeping assembly 00 as shown in FIG. 5. Alternatively, first, a plurality of strip and consecutive microcavities are formed on the first substrate 001 on which the first electrode 004 is formed, said plurality of microcavities being corresponding to the plurality of second electrodes 005 and the plurality of transmission electrodes 006 (i.e. each microcavity corresponding to one second electrode 005 or one transmission electrode 006), and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into the microcavity between each second electrode 005 and the first electrode 004 and nematic phase liquid crystals are perfused into the microcavity between each transmission electrode 006 and the first electrode 004 by means of the microcavity perfusion technology so as to obtain the anti-peeping assembly 00 as shown in FIG. 5.

In this example, if the second electrodes 005 are block electrodes, in step 1505, first, a plurality of microcavities arranged as a matrix are formed on the first substrate 001 on which the first electrode 004 is formed, an orthographic projection of each microcavity on the first substrate 001 having a block shape and the plurality of microcavities being corresponding to the plurality of second electrodes 005; then polymer liquid crystals are perfused into each microcavity and nematic phase liquid crystals are perfused into every two adjacent microcavities by means of the microcavity perfusion technology, next the side of the first substrate 001 on which the first electrode 004 is formed is faced and pressed to the side of the second substrate 002 on which the second electrode 005 is formed to obtain the anti-peeping assembly 00 as shown in FIG. 5. Alternatively, a plurality of microcavities arranged as a matrix are formed on the first substrate 001 on which the first electrode 004 is formed, an orthographic projection of each microcavity on the first substrate 001 having a block shape and the plurality of microcavities being corresponding to the plurality of transmission electrodes 006; then nematic phase liquid crystals are perfused into each microcavity and polymer liquid crystals are perfused into every two adjacent microcavities by means of the microcavity perfusion technology, next the side of the first substrate 001 on which the first electrode 004 is formed is faced and pressed to the side of the second substrate 002 on which the second electrode 005 is formed to obtain the anti-peeping assembly 00 as shown in FIG. 5. Alternatively, first, a plurality of consecutive microcavities are formed on the first substrate 001 on which the first electrode 004 is formed, said plurality of microcavities being corresponding to the plurality of second electrodes 005 and the plurality of transmission electrodes 006 (i.e. each microcavity corresponding to one second electrode 005 or one transmission electrode 006); then by means of the microcavity perfusion technology, polymer liquid crystals are perfused into the microcavity between the first electrode 004 and each second electrode 005 and nematic phase liquid crystals are perfused into the microcavity between the first electrode 004 and each transmission electrode 006; next the side of the first substrate 001 on which the first electrode 004 is formed is faced and pressed to the side of the second substrate 002 on which the second electrode 005 is formed to obtain the anti-peeping assembly 00 as shown in FIG. 5.

In the case where the anti-peeping assembly 00 is the anti-peeping assembly 00 as shown in FIG. 6, the anti-peeping assembly 00 can be made through the above steps 1501-1503 and the present step 1505. If the second electrodes 005 are strip electrodes, in step 1505, first, a plurality of strip microcavities arranged as an array are formed on the first substrate 001 on which the first electrode 004 is formed, said plurality of microcavities being corresponding to the plurality of second electrodes 005 and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into each microcavity by means of the microcavity perfusion technology and a vacuum environment is formed between every two adjacent microcavities so as to obtain the anti-peeping assembly as shown in FIG. 6. Alternatively, first, a plurality of strip microcavities arranged as an array are formed on the first substrate 001 on which the first electrode 004 is formed, said plurality of microcavities being corresponding to the plurality of transmission electrodes 006 and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into every two adjacent microcavities by means of the microcavity perfusion technology and a vacuum environment is formed in each microcavity so as to obtain the anti-peeping assembly 00 as shown in FIG. 6. Alternatively, first, a plurality of strip and consecutive microcavities are formed on the first substrate 001 on which the first electrode 004 is formed, said plurality of microcavities being corresponding to the plurality of second electrodes 005 and the plurality of transmission electrodes 006 (i.e. each microcavity corresponding to one second electrode 005 or one transmission electrode 006), and the length direction of any microcavity being parallel to the length direction of any second electrode 005; then disposing the side of the first substrate 001 on which the first electrode 004 is formed to face the side of the second electrode 002 on which the second electrode 005 is formed; finally polymer liquid crystals are perfused into the microcavity between each second electrode 005 and the first electrode 004 by means of the microcavity perfusion technology and a vacuum environment is formed in the microcavity between each transmission electrode 006 and the first electrode 004 so as to obtain the anti-peeping assembly 00 as shown in FIG. 6.

In this example, if the second electrodes 005 are block electrodes, in step 1505, first, a plurality of microcavities arranged as a matrix are formed on the first substrate 001 on which the first electrode 004 is formed, the plurality of microcavities being corresponding to the plurality of second electrodes 005; then polymer liquid crystals are perfused into each microcavity by means of the microcavity perfusion technology and a vacuum environment is formed between the first electrode 004 and each transmission electrode 006; next the side of the first substrate 001 on which the first electrode 004 is formed is faced and pressed to the side of the second substrate 002 on which the second electrode 005 is formed to obtain the anti-peeping assembly 00 as shown in FIG. 6. Alternatively, a plurality of microcavities arranged as a matrix are formed on the first substrate 001 on which the first electrode 004 is formed, the plurality of microcavities being corresponding to the plurality of transmission electrodes 006; then polymer liquid crystals are perfused into every two adjacent microcavities by means of the microcavity perfusion technology and a vacuum environment is formed in each microcavity; next the side of the first substrate 001 on which the first electrode 004 is formed is faced and pressed to the side of the second substrate 002 on which the second electrode 005 is formed to obtain the anti-peeping assembly 00 as shown in FIG. 6. Alternatively, first, a plurality of consecutive microcavities are formed on the first substrate 001 on which the first electrode 004 is formed, said plurality of microcavities being corresponding to the plurality of second electrodes 005 and the plurality of transmission electrodes 006 (i.e. each microcavity corresponding to one second electrode 005 or one transmission electrode 006); then polymer liquid crystals are perfused into the microcavity between the first electrode 004 and each second electrode 005 by means of the microcavity perfusion technology and a vacuum environment is formed in the microcavity between the first electrode 004 and each transmission electrode 006; next the side of the first substrate 001 on which the first electrode 004 is formed is faced and pressed to the side of the second substrate 002 on which the second electrode 005 is formed to obtain the anti-peeping assembly 00 as shown in FIG. 6.

It shall be noted that in the anti-peeping assembly 00 as shown in any one of claims 1-6, in response to application of the same voltage to the first electrode 004 and any second electrode 005 of the plurality of second electrodes 005, liquid crystals between the first electrode 004 and said any second electrode 005 scatter light, and in response to application of different voltages to said first electrode 004 and said any second electrode 005, liquid crystals between said first electrode 004 and said any second electrode 005 transmit light. In the anti-peeping assembly 00 shown in FIG. 1, 4 or 5, in response to application of different voltages to the first electrode 004 and any transmission electrode 006 of the plurality of transmission electrodes 006, liquid crystals between the first electrode 004 and said any transmission electrode 006 transmit light.

In the method for manufacturing an anti-peeping assembly as provided by the embodiment of the present disclosure, even if no transmission electrode is arranged on the second substrate, the anti-peeping function of the anti-peeping assembly can still be realized, so said method for manufacturing an anti-peeping assembly can reduce manufacturing processes and manufacturing costs.

FIG. 16 is a flow chart of a method for controlling an anti-peeping assembly provided in an embodiment of the present embodiment, said method can be used for controlling the anti-peeping assembly 00 as shown in any one of claims 1-6. Said method comprises:

step 1601: in response to the anti-peeping assembling being in an anti-peeping mode, applying a same voltage to the first electrode and the plurality of second electrodes of the anti-peeping assembly, so that liquid crystals between said first electrode and each of said plurality of second electrodes scatter light;

step 1602: in response to the anti-peeping assembly being in an non-anti-peeping mode, applying different voltages to the first electrode and the plurality of second electrodes of the anti-peeping assembly, so that liquid crystals between said first electrode and each of said plurality of second electrodes transmit light.

FIG. 17 is a flow chart of another method for controlling an anti-peeping assembly provided in an embodiment of the present embodiment, said method for controlling an anti-peeping assembly can be used for controlling the anti-peeping assembly 00 as shown in any one of claims 1-6. The embodiment of the present disclosure is described by taking the example of controlling the anti-peeping assembly 00 as shown in FIG. 4, in which the liquid crystals in the liquid crystal layer 003 are polymer liquid crystals. Said method comprises:

step 1701: in response to the anti-peeping assembling being in an anti-peeping mode, applying a same voltage to the first electrode and the plurality of second electrodes of the anti-peeping assembly, so that liquid crystals between said first electrode and each of said plurality of second electrodes scatter light, and applying different voltages to the first electrode and the plurality of transmission electrodes of the anti-peeping assembly, so that liquid crystals between said first electrode and each of said plurality of transmission electrodes transmit light.

As an example, referring to FIG. 4, the first voltage can be applied to the first electrode 004 and each second electrode 005 of the plurality of second electrodes 005, and the second voltage can be applied to each transmission electrode 006 of the plurality of transmission electrodes 006, so that the voltage difference between the first electrode 004 and each second electrode 005 is zero, the voltage difference between the first electrode 004 and each transmission electrode 006 is the pre-set voltage difference, and the polymer liquid crystals between the first electrode 004 and each second electrode 005 is in the initial state. Then the polymer liquid crystals between the first electrode 004 and each transmission electrode 006 deflect under the effect of the pre-set voltage difference so as to transmit light, and the polymer liquid crystals in the initial state scatter light. Alternatively, any voltage of the first voltage and the second voltage includes a voltage whose magnitude is zero, while applying the voltage whose magnitude is zero means that no voltage is applied.

Step 1702: in response to the anti-peeping assembly being in the non-anti-peeping mode, applying different voltages to the first electrode and the plurality of second electrodes of the anti-peeping assembly to enable liquid crystals between the first electrode and each second electrode of said plurality of second electrodes to transmit light, and applying different voltages to the first electrode and the plurality of transmission electrodes of the anti-peeping assembly to enable liquid crystals between the first electrode and each transmission electrode of said plurality of transmission electrodes to transmit light.

As an example, referring to FIG. 4, the first voltage can be applied to the first electrode 004, and the second voltage can be applied to each second electrode 005 of the plurality of second electrodes 005 and each transmission electrode 006 of the plurality of transmission electrodes 006, so that the voltage difference between the first electrode 004 and each second electrode 005 as well as the voltage difference between the first electrode 004 and each transmission electrode 006 are the pre-set voltage difference, and that all the polymer liquid crystals in the liquid crystal layer 003 deflect under the effect of the pre-set voltage difference so as to transmit light. Alternatively, any voltage of the first voltage and the second voltage includes a voltage whose magnitude is zero, while applying the voltage whose magnitude is zero means that no voltage is applied.

It shall be noted that the first voltage in step 1702 can be the same as or different from the first voltage in step 1701, and the second voltage in step 1702 can be the same as or different from the second voltage in step 1701, which are not limited by the embodiment of the present disclosure.

It shall also be noted that the above embodiment is described by taking the example of controlling the anti-peeping assembly 00 as shown in FIG. 4, while as for the process of controlling the anti-peeping assembly 00 as shown in any one of claims 1-3 and 5-6, reference can be made to the embodiment as shown in FIG. 4. However, it should be pointed out that since the nematic phase liquid crystals have a normally white display mode, the nematic phase liquid crystals in the initial state can also transmit light, so no matter whether a voltage is applied or whether a voltage difference exists, light can penetrate the nematic phase liquid crystals 0032 shown in FIGS. 2 and 5. In addition, a vacuum environment is formed between the first electrode 004 and the interval area (interval area between two adjacent second electrodes 005) in FIG. 3, and a vacuum environment is formed between the first electrode 004 and the transmission electrode 006 in FIG. 6, so no matter whether a voltage is applied or whether a voltage difference exists, light can penetrate the liquid crystal layer between the first electrode 004 and the interval area and the liquid crystal layer between the first electrode 004 and the transmission electrode 006.

An embodiment of the present disclosure further provides a display device, which comprises a display panel and the anti-peeping assembly 00 as shown in any one of FIGS. 1-6.

Those skilled in the art can understand that all or some of the steps for realizing the above embodiments can be carried out by hardware or by programs that instruct corresponding hardware, said programs can be stored in a computer-readable storage medium, and said storage medium can be a read-only memory, a magnetic disc or an optical disc.

The above described are merely optional embodiments of the present disclosure, but they do not intend to limit the present disclosure. Any modification, equivalent substitution, improvement, etc. made under the spirit and principle of the present disclosure shall be included in the protection scope of the present disclosure.

The invention claimed is:

1. An anti-peeping assembly, comprising:
   a first substrate and a second substrate arranged facing each other; and
   a liquid crystal layer located between said first substrate and said second substrate;
   wherein, a first electrode is disposed on said first substrate at a side near the liquid crystal layer, and a plurality of second electrodes arranged as an array are disposed on said second substrate at a side near the liquid crystal layer;
   wherein a plurality of transmission electrodes arranged as an array are also disposed on said second substrate at the side near the liquid crystal layer, and said plurality of transmission electrodes and said plurality of second electrodes are staggered in the same layer;
   wherein liquid crystals between said first electrode and each second electrode of said plurality of second electrodes are polymer liquid crystals, and liquid crystals between said first electrode and each transmission electrode of said plurality of transmission electrodes are nematic phase liquid crystals;
   and wherein, in response to applying no voltage or a same voltage to said first electrode, the second electrodes and the transmission electrodes, liquid crystals between said first electrode and said second electrodes scatter light so that the anti-peeping assembly realizes anti-peeping, and in response to applying different voltages to said first electrode and said second electrodes, and applying a same voltage to the transmission electrodes and the first electrode, liquid crystals between said first electrode and said second electrodes transmit light so that the anti-peeping assembly realizes non-anti-peeping.

2. The anti-peeping assembly according to claim 1, wherein
   said first electrode is any one of a plate electrode, a strip electrode and a block electrode;
   said second electrode is one of a strip electrode and a block electrode.

3. The anti-peeping assembly according to claim 1, wherein said transmission electrode has the same shape as said second electrode.

4. A method for controlling the anti-peeping assembly according to claim 1, comprising:
   in response to the anti-peeping assembly being in an anti-peeping mode, applying no voltage or a same voltage to said first electrode, the second electrodes and the transmission electrodes, so that liquid crystals between said first electrode and each second electrode of said plurality of second electrodes scatter light; and
   in response to the anti-peeping assembly being in an non-anti-peeping mode, applying different voltages to said first electrode and said second electrodes, and applying a same voltage to the transmission electrodes a first electrode, so that liquid crystals between said first electrode and each second electrode of said plurality of second electrodes transmit light.

5. A display device, comprising a display panel and the anti-peeping assembly of claim 1.

6. A method for manufacturing an anti-peeping assembly, comprising:
   providing a first substrate and a second substrate;
   forming a first electrode on said first substrate;
   forming a plurality of second electrodes arranged as an array on said second substrate;
   forming a plurality of transmission electrodes arranges as an array on said second substrate on which said plurality of second electrodes are formed, such that said plurality of transmission electrodes and said plurality of second electrodes are staggered in the same layer;
   arranging said first substrate to face said second substrate and disposing a liquid crystal layer between said first substrate and said second substrate, wherein, the first electrode is disposed on said first substrate at a side near the liquid crystal layer, and the plurality of second electrodes are disposed on said second substrate at a side near the liquid crystal layer;

wherein liquid crystals between said first electrode and each second electrode of said plurality of second electrodes are polymer liquid crystals, and liquid crystals between said first electrode and each transmission electrodes of said plurality of transmission electrodes are nematic phase liquid crystals;

wherein, in response to applying no voltage or a same voltage to said first electrode, the second electrodes and the transmission electrodes, liquid crystals between said first electrode and said second electrodes scatter light so that the anti-peeping assembly realizes anti-peeping, and in response to applying different voltages to said first electrode and said second electrodes, and applying a same voltage to the transmission electrodes and the first electrode, liquid crystals between said first electrode and said second electrodes transmit light so that the anti-peeping assembly realizes non-anti-peeping.

7. The method according to claim 6, wherein arranging a liquid crystal layer between said first substrate and said second substrate comprises:

arranging a liquid crystal layer between said first substrate and said second substrate by means of a microcavity perfusion technology.

* * * * *